United States Patent
Price et al.

(10) Patent No.: US 12,450,571 B2
(45) Date of Patent: Oct. 21, 2025

(54) METHOD AND SYSTEM FOR RULE-BASED AUGMENTATION OF PERCEPTIONS

(71) Applicant: Palo Alto Research Center Incorporated, Palo Alto, CA (US)

(72) Inventors: Robert R. Price, Palo Alto, CA (US); Shiwali Mohan, Palo Alto, CA (US)

( * ) Notice: Subject to any disclaimer, the term of this patent is extended or adjusted under 35 U.S.C. 154(b) by 1305 days.

(21) Appl. No.: 16/237,241

(22) Filed: Dec. 31, 2018

(65) Prior Publication Data
US 2020/0210967 A1  Jul. 2, 2020

(51) Int. Cl.
G06Q 10/20 (2023.01)
G06T 19/00 (2011.01)
G06V 10/82 (2022.01)
G06V 20/20 (2022.01)
G06V 10/44 (2022.01)

(52) U.S. Cl.
CPC .......... *G06Q 10/20* (2013.01); *G06T 19/006* (2013.01); *G06V 10/82* (2022.01); *G06V 20/20* (2022.01); *G06V 10/454* (2022.01)

(58) Field of Classification Search
CPC .. G05B 11/32; G05B 19/042; G05B 19/0425; G06Q 10/20
See application file for complete search history.

(56) References Cited

U.S. PATENT DOCUMENTS

2016/0349511 A1* 12/2016 Meiron ................ G02B 27/017

OTHER PUBLICATIONS

Adepu et al. Control Behavior Integrity for Distributed Cyber-Physical Systems (Year: 2018).*
Mueller, How To Get Phone Notifications When Your Brother HL-3170CDW Printer Runs Out Of Paper, https://web.archive.org/web/20180201064332/http://www.shareyourrepair.com/2014/12/how-to-get-push-notifications-from-brother-printers-with-gmail-boxcar.html (Year: 2018).*
Epson Printer Says Out of Paper but It Isn't, https://smartprintsupplies.com/blogs/news/p-strong-epson-printer-says-out-of-paper-but-it-isnt-strong-p-p-p (Year: 2018).*

* cited by examiner

*Primary Examiner* — Aryan E Weisenfeld

(57) ABSTRACT

One embodiment can provide a system for augmenting perceptions of a machine sensing system. During operation, one or more sensors of the system can obtain sensory information associated with a physical system. The system can determine a state of a first component of the physical system based on the obtained sensory information; select, from a rule database, one or more logical rules associated with at least the first component; and augment a perception of the machine sensing system toward the physical system based on both the determined state of the first component and the selected one or more logical rules, thereby facilitating the machine sensing system to make a decision associated with the physical system.

17 Claims, 5 Drawing Sheets

METHOD AND SYSTEM FOR RULE-BASED AUGMENTATION OF PERCEPTIONS

BACKGROUND

Field

This disclosure is generally related to machine sensing. More specifically, this disclosure is related to A system and method that implements logic rules to augment the perception of a machine sensing system.

Related Art

Recent developments in machine vision technologies have made computer-assisted servicing or remote servicing possible. For example, augmented reality (AR) can be used in the service industry to facilitate a tethered telepresence, a visual retrieval of information, and a repair script with overlays. In a tethered telepresence, a remote technician can interact with a user to provide guided repair. In a visual retrieval of information (e.g., smartphone apps for car manuals), a camera may retrieve a model number, manual pages, or telemetry statistics. In a repair script with overlays, a checklist or procedural prompt may be overlaid on a user's view, and the user can click through the overlaid view.

In all the above cases, a user of a local physical system can be equipped with machine vision equipment (e.g., a head-mounted camera or smartglasses) that can capture images of the local physical system. Information associated with the local physical system (e.g., states of the different components within the local physical system) can be inferred based on the captured images. However, visual information captured by the in-field camera can be noisy and intermittent.

SUMMARY

One embodiment can provide a system for augmenting perceptions of a machine sensing system. During operation, one or more sensors of the system can obtain sensory information associated with a physical system. The system can determine a state of a first component of the physical system based on the obtained sensory information; select, from a rule database, one or more logical rules associated with at least the first component; and augment a perception of the machine sensing system toward the physical system based on both the determined state of the first component and the selected one or more logical rules, thereby facilitating the machine sensing system to make a decision associated with the physical system.

In a variation on this embodiment, logical rules within the rule database are generated based on domain knowledge associated with the physical system.

In a variation on this embodiment, a respective selected rule is associated with both the first component and a second component within the physical system, and augmenting the perception comprises determining a state of the second component based on both the state of the first component and the selected one or more logical rules.

In a variation on this embodiment, a respective selected rule can include a persistence rule specifying a predetermined duration, and augmenting the perception of the machine sensing system can include allowing the determined state of the first component to persist during the predetermined duration.

In a further variation, the persistence rule further specifies a rule-overriding condition.

In a variation on this embodiment, the system generates a repair or maintenance plan for the physical system based on the augmented perception of the machine sensing system toward the physical system.

In a further variation, the one or more sensors include at least one image sensor belonging to an augmented reality system. The system displays instructions for executing the repair or maintenance plan by overlaying the instructions on images captured by the image sensor.

BRIEF DESCRIPTION OF THE FIGURES

In the figures, like reference numerals refer to the same figure elements.

DETAILED DESCRIPTION

Figure 1:
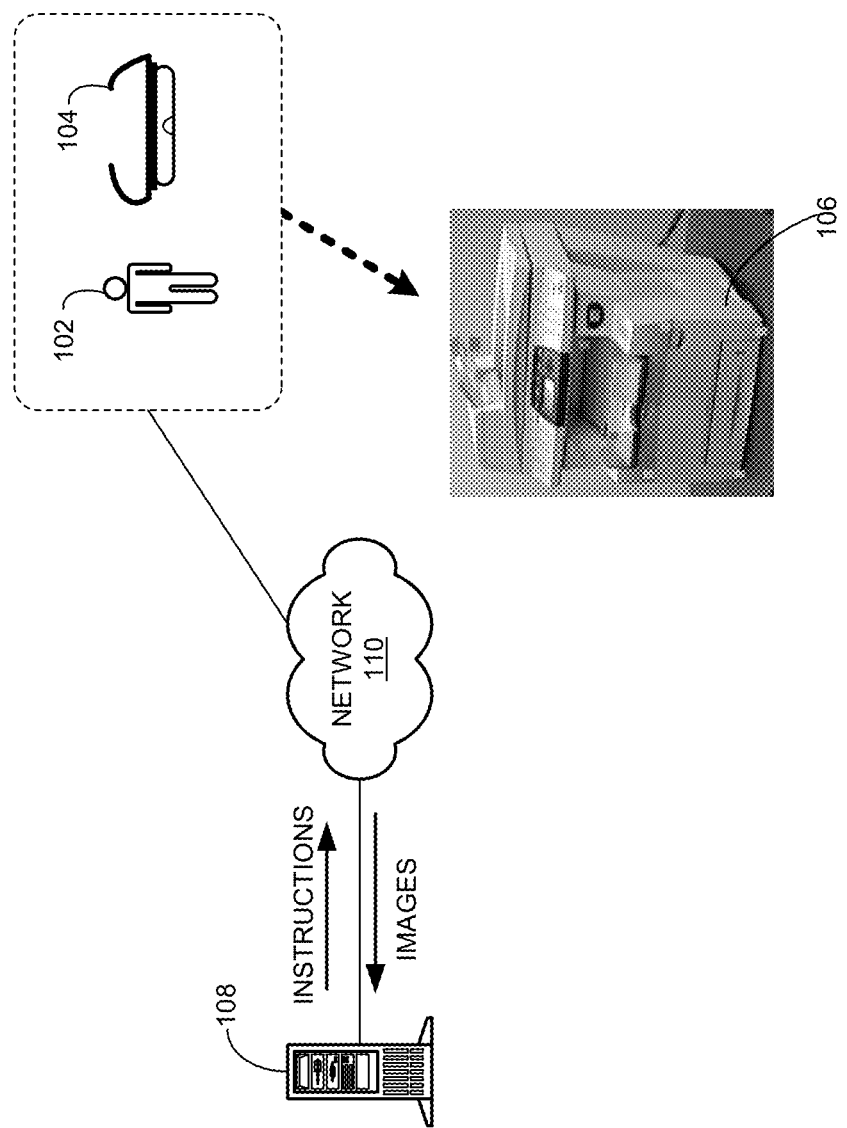
FIG. 1 presents an exemplary use scenario of the logical-perception-augmentation system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein solve the technical problem of enhancing perceptions of a machine vision system by incorporating domain-specific logical knowledge when extracting information from captured images. More specifically, the machine system can apply a set of predetermined logical rules (which can be based on knowledge of the physical system under observation), which can be in the form of frame axioms, to infer and sometimes persist the states of components within the physical system under observation. The machine vision system can include one or more inference engines and a rule database. The inference engines can create an expanded persistent estimate of a state of the physical world based on one or more logical rules extracted from the rule database. Because the logical rules are generated based on an extended history of perceptions received by the machine vision system and the background domain knowledge of the physical world, the estimated state of the physical world is consistent with the perception system and the background knowledge.

Machine Vision System with Enhanced Perception

Autonomous systems that use sensors to collect information about the physical world face the problem of making decisions based on signals that contain noisy information about quantities in the physical world. For example, sound and light sensors inevitably pick up background sound and light signals, or the global positioning system (GPS) sensors can have limited precision. Typically, the automated system can use filtering on perceptual inputs to increase the smoothness and reliability of processes that depend on sensors. For example, Kalman filters can be used to smooth the estimates of continuous quantities, such as the coordinates of a tracked object.

In the case of machine sensing systems for the extraction of discrete semantic states (e.g., a machine vision system), instead of returning continuous quantities, the sensors return high-level semantic concepts, such as the opened or closed state of a door on a printer or the presence of a particular component on a device. One cannot apply simple filters (e.g., Kalman filters) to the machine vision problem. Moreover, machine vision systems for extracting discrete semantic states also face other challenges, such as occlusion. For example, if the hood of a being-serviced car is closed, the system cannot obtain information about the state of the engine. Alternatively, if the door for accessing a toner cartridge of a printer is closed, the system cannot obtain information about the state of the toner cartridge. In an egocentric vision system where the images are captured by a wearable camera which moves along with the user's gaze, the user's viewpoint can change rapidly, meaning that a state of relevant parts of the environment sometimes is ascertainable from the user's view and sometimes not.

To cope with these complexities associated with the machine vision system, some existing machine systems rely on custom-designed program code to post-process the symbolic outputs of the system. However, such solutions are difficult to understand and maintain and require specialists who understand computer programming.

Some embodiments of the present invention provide a logical-perception-augmentation system that uses logical rules to augment the perceptual information. More specifically, the logical-perception-augmentation system can include a plurality of inference engines for inferring a state of the physical world using pre-coded or predetermined logical rules. The logical rules can be generated based on domain knowledge. For example, if the machine sensing system is used for service or maintenance of a printer, the logical rules can be generated based on prior knowledge of the printer. In one scenario, a machine vision system recognizes a printer toner cartridge but the printer access door is out of view. Based on the prior knowledge of the printer, the machine vision system can infer that the state of the printer door must be open. Such knowledge can be in the form of a three-dimensional (3D) computer-aided design (CAD) model, and the logical rules can be in the form of high-level semantics. Depending on the platform of the application, the logical rules can be implemented accordingly.

In addition to expanding the inference about the instantaneous state of an observed system, the logical rules can also be used to infer state over a time interval. More specifically, the system can have built-in or default persistence or frame axioms. Such persistence can be used to infer state of a component at a later time given observation at a prior time. This knowledge can take into account domain specific expectations. For example, if an observation at a particular time is that the printer's door is open, the machine vision system can assume that, after a very small time increment, the printer's door remains open. The door is unlikely to stay open more than 10 minutes or so as replacing a cartridge can be done quickly. If an observation at a particular time is that a complex device (e.g., a printer) has been disassembled, the system can assume that, after a relatively short time interval (e.g., a few minutes), it is highly unlikely that the various components are back together and that the complex device may very likely still be disassemble an hour from now.

FIG. 1 presents an exemplary use scenario of the logical-perception-augmentation system, according to one embodiment. In the example shown in FIG. 1, a user 102 is equipped with an augmented reality (AR) headset (e.g., the Microsoft HoloLens™ system) 104 and is performing maintenance on a printer 106. The AR headset is capable of capturing and displaying images of a real-word or physical object in a real-world environment or scene. Note that the HoloLens can use an RGB-D (red green blue plus depth) camera plus a Simultaneous Localization and Mapping (SLAM) style algorithm to build a model of the room, and allows a user to overlay computer-generated objects (e.g., labeling or action instructions) in the real-world scene.

Figure 2:
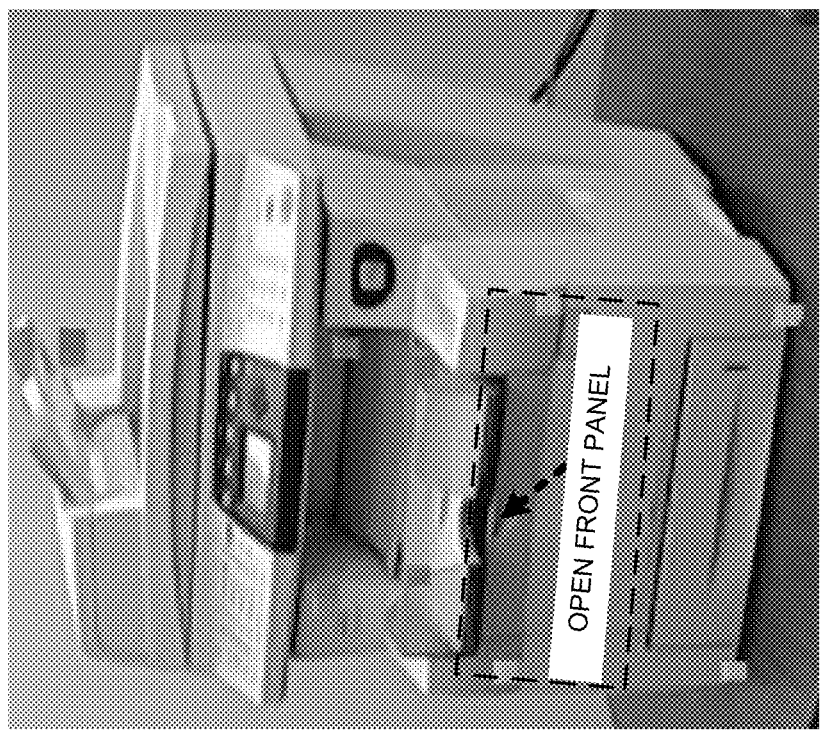
FIG. 2 illustrates operating instructions overlaid onto the image of a printer, according to one embodiment.

More specifically, images of printer 106 can be sent by AR headset 104 to a server 108 via a network 110. Server 108 can include a cognitive engine that performs various image-recognition operations, such as feature extraction and tracking. Based on extracted and tracked features, the cognitive engine in server 108 can determine the state of one or more components of printer 106. For example, the cognitive engine can determine whether the toner door is open or closed, or whether the paper tray has been pulled out. Based on the determined state and a set of predetermined maintenance rules or procedures, a strategic-planning module can generate a plan and corresponding operating instructions. In some embodiments, the operating instructions can be sent from server 108 to AR headset 104. AR headset 104 can then overlay the instructions onto the displayed images of printer 106 (e.g., as annotation), prompting the user to perform corresponding operations. For example, FIG. 2 illustrates operating instructions overlaid onto the image of a printer, according to one embodiment. More particularly, in FIG. 2, the computer-generated annotation points the user to the location of a front panel and prompts the user to open the front panel. In some embodiments, the computer-generated annotation can also be in the format of an animation, showing the front panel being opened, thus providing a more straightforward visual cue to the user.

To be able to provide the user with accurate and timely instructions, the cognitive engine needs to know, with great certainty, the current state of the device being serviced. However, the accurate state information may not be readily available. For example, as the user moves closer to the being-serviced physical device or equipment, the field of view (FOV) of the camera may narrow, resulting in certain components disappearing from the FOV. Moreover, the user may move around, such as turning his head, which can also cause certain objects to disappear from the FOV of the camera. However, knowing the state of those components or objects is important for the strategic-planning module to plan for the next move.

In some embodiments, to facilitate the strategic-planning module to make decisions, whenever there is an uncertainty regarding the state of one or more components in the observed physical device or system, the machine vision system can rely on logical rules to infer the state. More specifically, the strategic-planning module can receive inputs from an inference module, which provides an inferred state of the one or more components based on the observation as well as the predetermined logical rules.

For example, when planning for instructions, the strategic-planning module needs to be provided with the state of the toner door of the printer. However, the toner door is not currently in the FOV of the camera. On the other hand, the image-analysis result indicates that the toner is shown in the captured image. Based on this information and the prior knowledge of the printer (i.e., the toner can only be seen when the toner door is open), the inference module can infer the state of the toner door as being open. The inferred state can then be sent to the strategic-planning module, which plans for the instruction to be sent. In this scenario, instead of overlaying an "open the toner door" instruction, the AR headset may overlay an instruction on the image of the toner to prompt the user to remove the toner.

Figure 3:
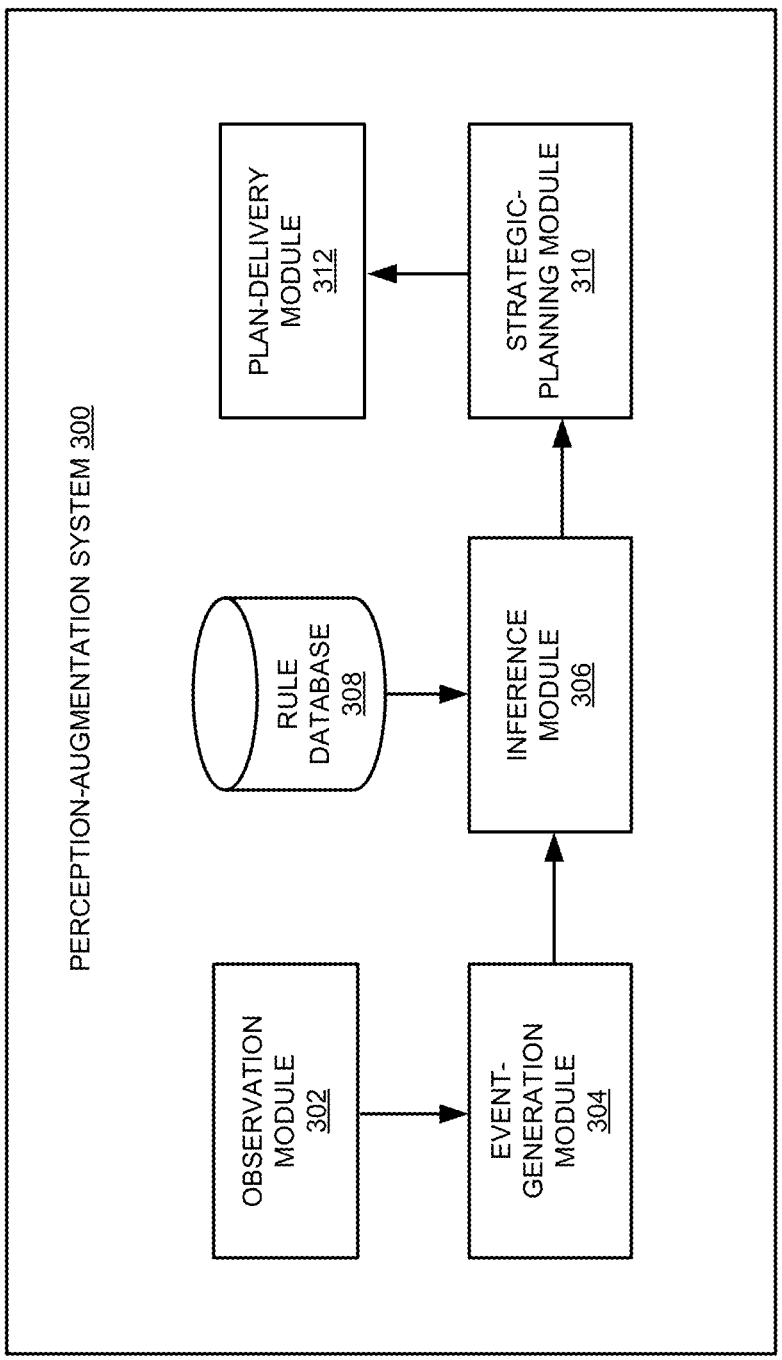
FIG. 3 presents a diagram illustrating an exemplary perception-augmentation system, according to one embodiment.

FIG. 3 presents a diagram illustrating an exemplary perception-augmentation system, according to one embodiment. Perception-augmentation system 300 can be used for facilitating AR-based remote assistance and maintenance. Perception-augmentation system 300 can include an observation module 302, an event-generation module 304, an inference module 306, a rule database 308, a strategic-planning module 310, and a plan-delivery module 312.

Observation module 302 can be responsible for obtaining observations of a physical system by collecting sensor data. The sensor data can be provided by cameras as well as other types of sensors, such as sound sensors, GPS sensors, motion sensors, etc.

Event-generation module 304 can be responsible for generating events based on outputs of observation module 302. In some embodiments, event-generation module 304 analyzes sensor data to provide a current state of the physical system. If the sensor data includes images, event-generation module 304 can perform various image-processing operations, including feature extraction and feature tracking. In other words, event-generation module 304 can be responsible for translating raw sensor data to high-level events.

Inference module 306 can be responsible for inferring the state of the observed physical system, including the state of each individual component within the observed physical system, based on events received from event-generation module 304 as well as logical rules selected from rule database 308. Note that the state of the observed physical system may not be inferred from the events alone, because the observed events may be incomplete or contradictive due to sensor noise. To accurately and stably infer the state, inference module 306 needs to combine the events with one or more logical rules from rule database 308. In other words, the logical rules enhance or augment the perception of perception-augmentation system 300 such that the associated machine vision system can obtain state information of the observed physical system beyond the simple observation. The inferred state can be persistent unless a later observation overrules the inferred state. In some embodiments, the inferred state can be associated with a time parameter (e.g., duration of effectiveness). A domain expert can set the time parameter associated with a state based on knowledge of the physical system. For example, it is known that under normal operating conditions, the paper tray of a printer is closed. Hence, if the inferred state of the paper tray is "closed," such a state can be persistent over a predetermined time (e.g., a few seconds).

Rule database 308 stores domain-specific logical rules that can be used for inferring the state of the physical system. In some embodiments, the logical rules can encode detailed knowledge regarding the physical system, including the relative positions among components under default operating conditions.

One type of logical rules is known as an augmentation rule, which can be used to infer the instant state of the physical system. For example, an augmentation rule can be: "if component A is observed to be in a certain state, then component B, observation of which is unavailable, must be in a particular state," or "if components A and B are observed to behave in a certain way, then the physical system must be in a certain state, although observation of other components within the physical system is not available."

Another type of logical rules is known as a persistence rule, which can be used to infer the further state of the physical system based on the current state of the physical system or the current observation. More specifically, a persistence rule can define a likely duration a state will persist. For example, a persistence rule can be "if component A is in state X, component A will remain in state X for time t." In further embodiments, the persistence rule may also specify that certain observations may override the default. For example, a persistence rule can be: "if component A is in state X, component A will remain in state X for time t, unless observation O occurs." In such a scenario, when the observation breaks the default state, the state of the component needs to be re-inferred based on the observation and other rules.

The persistence rules provide a simpler way for system users to describe the time-varying states of the various components than a full probabilistic model. The simplest persistence rule can be in the form of: absent of specific information about a component A, assume that the state of component A persists. This rule allows the state of a component to be inferred based on a previous observation, if a current observation of the component is not available. Moreover, the domain knowledge can also provide information regarding the default states of components. For instance, the document feeder on the top of a printer gets opened when the user scans a document but is typically closed, meaning that its default state is closed. A persistence rule that utilizes the default state information can be in the following form: given that the default state of a component A is X, in the absence of specific information about component A, the current state of component A persists for T seconds and then revert to default state X.

Strategic-planning module 310 can be responsible for generating repair or maintenance plans based on the inferred state of the physical system. In some embodiments, strategic-planning module 310 can generate a plan based on the inferred state. The plan may include multiple steps, with each step being associated with an instruction to the user for performing a certain action, e.g., opening a toner door, removing the toner, replacing the toner, and closing the toner door, etc. Strategic-planning module 310 may dynamically update or change the plan based on new observations and newly inferred states. When generating instructions according to the repair or maintenance plan, strategic-planning module 310 can also take into account the user's expertise. A more detailed instruction can be generated and displayed to a novice user, whereas a simpler instruction can be generated and displayed to an expert user.

In some embodiments, when the state of a component is unknown either due to lack of information or due to conflicting observations, strategic-planning module 310 can generate specific information-gathering instructions, which prompt the user to perform certain actions to assist the system in obtaining information that can be used to infer the state of the component. For example, an information-gathering instruction can be "please look at the toner cartridge and see if the locking lever has been released," possibly accompanied by an animation showing where the toner cartridge is.

Plan-delivery module 312 can be responsible for delivering the repair or maintenance plan to the user. In some embodiments, the repair or maintenance plan can be delivered to the AR headset worn by the user and be displayed as step-by-step instructions. In further embodiments, the step-by-step instructions can be displayed as a computer-generated annotation overlaying the real-world scene captured by the camera. More specifically, the instructions can be in the form of an animation showing the movements of the corresponding components within the physical system.

As the user performs the repair or maintenance operation according to the instructions, observation module 302 continues to make observations of the physical system, event-generation module 304 generates new events based on the observations, and inference module 306 infers the state of the physical system based on the new events and associated logical rules obtained from rule database 308. Strategic-planning module 310 can then determine whether the current repair or maintenance plan needs to be updated based on the current state of the physical system. If so, strategic-planning module 310 updates the plan and sends the updated plan to plan-delivery module 312, which delivers the updated plan to the user.

In some embodiments, the various modules in the machine vision system can be implemented in the Soar cognitive engine, which is a first-order logic framework that allows for definition of abstract classes of rules. The logical rules stored in the rule database can then be written as first-order logic rules, which can use quantified variables over generic object classes. For example, if there are multiple paper trays in a printer, the rule about the paper tray can be written as: "for all X, X is a paper tray, if X is open, then X will remain open for time t unless observation O is made." In such a scenario, the logical rules can be applied to a class of entities (e.g., paper trays) not just an individual component (e.g., a particular paper tray).

Moreover, the rule-based perception-augmentation system can be modularized in such a way that other intelligent agents, in addition to the strategic-planning module, can access the sensor data or the events generated by the event-generation module and apply their own logical rules when making decisions.

In some embodiments, the egocentric vision system may collect transient observations (e.g., observations last for a brief amount of time due to an object moving in and out of the FOV). To ensure that the transient observations can be obtained by the inference module or inference engine, each event generated by the event-generation module can be timestamped and maintained in an event queue. On the other hand, when the inference module requests events in order to infer the current state of the observed physical system, it can issue a command which specifies a time instant when the latest state inference was performed. In response, the event generation module can return all events stored in the queue since the specified time instant based on timestamps of those events. This allows the observation module and the inference module to operate at different frequencies. Note that the observation module typically operates at a higher frequency than that of the inference engine. Moreover, because the events are timestamped, each individual client (e.g., other types of intelligent agent) can request events suitable for its particular need, thus allowing multi-client asynchronous access to the events.

Figure 4:
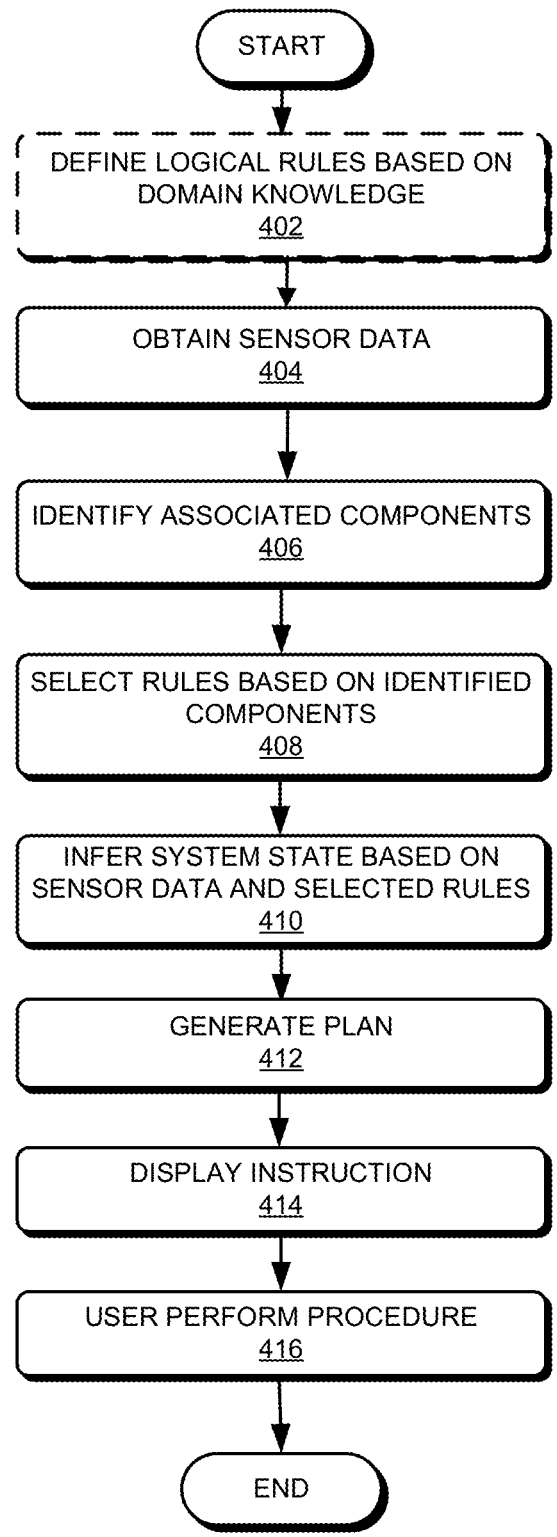
FIG. 4 presents a flowchart illustrating an exemplary AR-assisted repair or maintenance process, according to one embodiment.

FIG. 4 presents a flowchart illustrating an exemplary AR-assisted repair or maintenance process, according to one embodiment. Prior to starting the AR-assisted repair or maintenance of a physical system, a domain expert needs to generate a set of domain-specific logical rules based on the domain model (operation 402). The domain-specific logical rules can include both time-independent augmentation rules as well as time-dependent persistence rules. In some embodiments, the persistence rules can be associated with a time parameter, which specifies the duration of state persistence. A persistence rule can also specify a particular type of observation that can break the persistent state.

During operation, the system obtains sensor data, which can include live images of the physical system (operation 404). The system identifies components associated with the sensor data (e.g., captured images) (operation 406). For example, if the physical system is a printer, the machine vision system needs to identify key components (e.g., paper tray or toner) of the printer. The system can then select one or more logical rules from the rule database based on the identified components (operation 408). More particularly, the system selects rules that are appropriate for the current situation based on the identified components. For example, if the paper tray is identified in the captured images, the selection will select rules associated with the paper tray.

Subsequently, the system infers the state of the physical system (e.g., the state of one or more components) based on both the sensor data (e.g., captured images) and the selected rules (operation 410). These logical rules expand the machine vision system's perception toward the physical system beyond the sensor data in such a way that the state of a component not in the image can be inferred or a future state of a component can be inferred. Moreover, in situations where the sensor data is noisy, applying the logical rules can filter out the noise in the sensor data. For example, if the FOV of the camera changes rapidly causing a component to move in and out of the FOV, the state of the component can still be inferred using the persistence rule.

The inferred state of the physical system allows the machine vision system to generate a repair or maintenance plan (operation 412). More specifically, the plan is generated based on the currently inferred state and can be dynamically updated based on subsequent observations of the physical system. The machine vision system can then deliver and display the repair or maintenance plan to the user (operation 414). In some embodiments, the repair or maintenance plan can be displayed as AR annotations (e.g., the instructions) overlaid onto the live images of the physical system. In further embodiments, the displayed instructions can be in the format of an animation. The user can then perform the needed operations (e.g., repair or maintenance procedures) on the physical system (operation 416).

Exemplary Computer and Communication System

Figure 5:
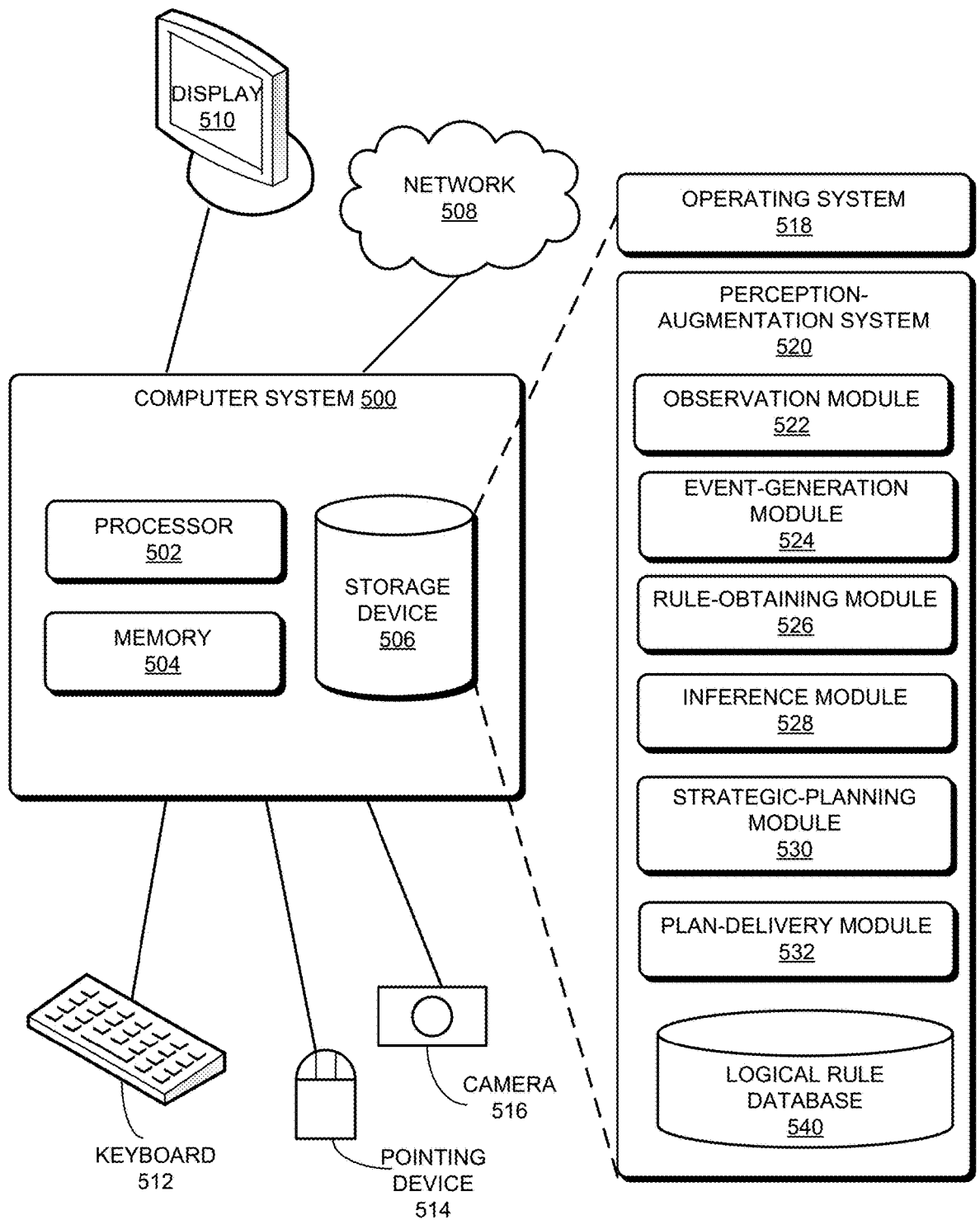
FIG. 5 illustrates an exemplary computer system that facilitates a perception-augmentation system, according to one embodiment.

FIG. 5 illustrates an exemplary computer system that facilitates a perception-augmentation system, according to one embodiment. Computer system 500 includes a processor 502, a memory 504, and a storage device 506. Computer system 500 can be coupled to a display device 510, a keyboard 512, a pointing device 514, a camera 516, and can also be coupled via one or more network interfaces to network 508. Storage device 506 can store an operating system 518 and a perception-augmentation system 520.

Perception-augmentation system 520 can include instructions, which when executed by computer system 500 can cause computer system 500 to perform methods and/or processes described in this disclosure. Perception-augmentation system 520 can include instructions for obtaining observations (observation module 522), instructions for generating events based on observations (event-generation module 524), instructions for accessing logical rule database 540 to obtain logical rules (rule-obtaining module 526), and instructions for inferring states (inference module 528). If perception-augmentation system 520 is used for AR-assisted repair or maintenance, perception-augmentation system 520 can further include instructions for planning repair or maintenance operations (strategic-planning module 530) and instructions for delivering the plan to users (plan-delivery module 532).

In general, embodiments of the present invention provide a solution for augmenting perceptions of a machine sensing system. Although machine vision systems are used as examples throughout this disclosure, the scope of this invention is not limited to machine visions. For example, in addition to enhancing the perception of a machine vision system, the solution provided by embodiments of the present invention can also be used to enhance the perception of a machine auditory system. Given an audio recording, a machine-learning module (e.g., a one-dimensional convolutional neural network (CNN) can be used to classify the audio recording into an event. This event can participate in the state inference the same way as any other event (e.g., an event derived from captured images or videos). For instance, if the bearings on the paper feeder assembly needed replacing, it might make a grating sound during operation. Detecting of such sound can be used to infer this state. The same principle can also be used to enhance other types of machine sensory.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for augmenting perceptions of a machine vision system, the method comprising:
   obtaining, by one or more image sensors, visual information associated with a physical system comprising at least a first component and a second component;
   determining a viewed state of the first component of the physical system based on the obtained visual information;
   selecting, from a rule database, one or more logical rules that correlate states of the first component with states of the second component of the physical system, wherein the second component is out of view of the one or more image sensors;
   inferring a state of the second component, the state of the second component being out of view of the one or more image sensors, by correlating the viewed state of the first component with the inferred state of the second component based on the selected one or more logical rules; and
   augmenting a perception of the machine vision system toward the physical system based on both the viewed state of the first component and the inferred state of the second component, thereby facilitating the machine vision system to make a decision associated with the physical system.

2. The method of claim 1, wherein logical rules within the rule database are generated based on domain knowledge associated with the physical system.

3. The method of claim 1, wherein a respective selected rule comprises a persistence rule specifying a predetermined duration, and wherein augmenting the perception of the machine vision system comprises allowing the viewed state of the first component to persist during the predetermined duration.

4. The method of claim 3, wherein the persistence rule further specifies a rule-overriding condition.

5. The method of claim 1, further comprising generating a repair or maintenance plan for the physical system based on the augmented perception of the machine vision system toward the physical system.

6. The method of claim 5, wherein at least one image sensor belongs to an augmented reality system, and wherein the method further comprises displaying instructions for executing the repair or maintenance plan by overlaying the instructions on the images captured by the image sensor.

7. A non-transitory computer-readable storage medium storing instructions that when executed by a computer cause the computer to perform a method for augmenting perceptions of a machine vision system, the method comprising:
   obtaining, by one or more image sensors, visual information associated with a physical system comprising at least a first component and a second component;
   determining a viewed state of the first component of the physical system based on the obtained visual information;
   selecting, from a rule database, one or more logical rules that correlate states of the first component with states of the second component of the physical system, wherein the second component is out of view of the one or more image sensors;
   inferring a state of the second component, the state of the second component being out of view of the one or more image sensors, by correlating the viewed state of the first component with the inferred state of the second component based on the selected one or more logical rules; and
   augmenting a perception of the machine vision system toward the physical system based on both the viewed state of the first component and the inferred state of the second component, thereby facilitating the machine vision system to make a decision associated with the physical system.

8. The non-transitory computer-readable storage medium of claim 7, wherein logical rules within the rule database are generated based on domain knowledge associated with the physical system.

9. The non-transitory computer-readable storage medium of claim 7, wherein a respective selected rule comprises a persistence rule specifying a predetermined duration, and wherein augmenting the perception of the machine vision system comprises allowing the viewed state of the first component to persist during the predetermined duration.

10. The non-transitory computer-readable storage medium of claim 9, wherein the persistence rule further specifies a rule-overriding condition.

11. The non-transitory computer-readable storage medium of claim 7, wherein the method further comprises generating a repair or maintenance plan for the physical system based on the augmented perception of the machine vision system toward the physical system.

12. The non-transitory computer-readable storage medium of claim 11, wherein at least one image sensor belongs to an augmented reality system, and wherein the method further comprises displaying instructions for executing the repair or maintenance plan by overlaying the instructions on images captured by the image sensor.

13. A computer system for augmenting perceptions of a machine vision system, the system comprising:
 a processor; and
 a storage device coupled to the processor and storing instructions which when executed by the processor cause the processor to perform a method, wherein the method comprises:
  obtaining, by one or more image sensors, visual information associated with a physical system comprising at least a first component and a second component;
  determining a viewed state of the first component of the physical system based on the obtained visual information;
  selecting, from a rule database, one or more logical rules that correlate states of the first component with states of the second component of the physical system,
 wherein the second component is out of view of the one or more image sensors;
  inferring a state of the second component, the state of the second component being out of view of the one or more image sensors, by correlating the viewed state of the first component with the inferred state of the second component based on the selected one or more logical rules; and
  augmenting a perception of the machine vision system toward the physical system based on both the viewed state of the first component and the inferred state of the second component, thereby facilitating the machine vision system to make a decision associated with the physical system.

14. The computer system of claim 13, wherein logical rules within the rule database are generated based on domain knowledge associated with the physical system.

15. The computer system of claim 13, wherein a respective selected rule comprises a persistence rule specifying a predetermined duration, wherein augmenting the perception of the machine vision system comprises allowing the viewed state of the first component to persist during the predetermined duration, and wherein the persistence rule further specifies a rule-overriding condition.

16. The computer system of claim 13, wherein the method further comprises generating a repair or maintenance plan for the physical system based on the augmented perception of the machine vision system toward the physical system.

17. The computer system of claim 16, wherein at least one image sensor belongs to an augmented reality system, and wherein the method further comprises displaying instructions for executing the repair or maintenance plan by overlaying the instructions on images captured by the image sensor.

* * * * *